US006556276B2

(12) United States Patent
Staeheli et al.

(10) Patent No.: US 6,556,276 B2
(45) Date of Patent: Apr. 29, 2003

(54) PHOTOGRAPHIC REORDER SYSTEM AND METHOD

(75) Inventors: Willi Staeheli, Untersiggenthal (CH); Douglas A. Kenyon, Brimfield, MA (US); Marc Sevigny, Springfield, MA (US); Michael Jefferson, Agawam, MA (US)

(73) Assignee: Gretag Imaging, Inc., Holyoke, MA (US)

( * ) Notice: Subject to any disclaimer, the term of this patent is extended or adjusted under 35 U.S.C. 154(b) by 0 days.

(21) Appl. No.: 09/876,766

(22) Filed: Jun. 7, 2001

(65) Prior Publication Data

US 2002/0110374 A1 Aug. 15, 2002

Related U.S. Application Data

(60) Provisional application No. 60/267,984, filed on Feb. 9, 2001.

(51) Int. Cl.[7] .......................... G03B 27/52; G03B 27/62

(52) U.S. Cl. ............................ 355/40; 355/75; 358/487

(58) Field of Search ............................. 355/18, 40, 41, 355/46, 75, 76, 77, 27; 358/506, 474, 487; 348/96, 97; 396/311, 429, 315, 319, 564, 612, 613, 620

(56) References Cited

U.S. PATENT DOCUMENTS

| | | | | | |
|---|---|---|---|---|---|
| 5,321,465 | A | * | 6/1994 | Hicks | 355/77 |
| 5,354,994 | A | | 10/1994 | Hicks | |
| 5,404,197 | A | | 4/1995 | Hicks | |
| 5,452,050 | A | * | 9/1995 | Ishikawa et al. | 355/27 |
| 5,835,202 | A | * | 11/1998 | Rosati et al. | 355/75 |
| 5,841,516 | A | * | 11/1998 | Miyawaki et al. | 15/100 |
| 5,841,885 | A | * | 11/1998 | Neff et al. | 348/64 |
| 5,901,949 | A | | 5/1999 | Muranaka et al. | |
| 5,926,288 | A | * | 7/1999 | Dellert et al. | 358/408 |
| 6,017,157 | A | * | 1/2000 | Garfinkle et al. | 355/40 |
| 6,040,891 | A | * | 3/2000 | Makino et al. | 355/46 |
| 6,094,541 | A | | 7/2000 | Alexandre et al. | |
| 6,118,556 | A | * | 9/2000 | Yamamoto et al. | 358/474 |
| 6,243,171 | B1 | * | 6/2001 | Haneda | 358/1.15 |
| 6,317,221 | B1 | * | 11/2001 | Aikawa et al. | 358/1.9 |
| 6,324,345 | B1 | * | 11/2001 | Enomoto | 355/41 |
| 6,389,159 | B2 | * | 5/2002 | Gilman et al. | 382/162 |

* cited by examiner

*Primary Examiner*—Alan A. Mathews
(74) *Attorney, Agent, or Firm*—Peter F. Corless; Steven M. Jensen; Edwards & Angell, LLP

(57) ABSTRACT

A digital reorder system and med is disclosed for making reprints from a negative strip. The strip advances toward a digital scanner which reads the bar code adjacent each frame to determine frame number and other parameters, and an image associated with each frame is scanned by a digital camera. Computer software manipulates the bar code information and the scanned image to place the image in a proper orientation. Consequently, the operator need not spend time orienting the negative strips prior to insertion into the feeder. The reorder system can include a multiple strip feeder which receives a stack of negative strips and automatically feeds the strips one-by-one into the reorder system.

22 Claims, 3 Drawing Sheets

PHOTOGRAPHIC REORDER SYSTEM AND METHOD

REFERENCE TO RELATED APPLICATION(S)

The present invention claims a right of priority to provisional application Ser. No. 60/267,984 entitled"Photographic reorder system and method," which was filed in the United States Patent and Trademark Office on Feb. 9, 2001.

BACKGROUND OF THE INVENTION

1. Field of the Invention

The present invention resides in the field of photographic reproduction systems, and more particularly relates to a digital reorder system and method for making prints from film negatives.

2. Background

Film processing and reprint systems are known in the prior art. Conventional cameras produce photographic images on many different film formats, including 135 (e.g. print, black and white, and slide film for standard 35 mm cameras), Advanced Photo System (APS), 120, 126, and 110 film types. Prints are usually provided to a consumer in an envelope, along with negatives which are small, cut strips of film typically 3 to 5 inches in length. The negatives can include only a single frame or several frames in succession. Generally, the frames are identified by numbers printed below the image. The negatives are often flat and include from two to six numbered frames.

FIG. 5 illustrates a conventional negative strip 80 of 135 film. The strip 80 includes a plurality of frames 82 (as shown, three frames), each of the frames containing an image and being identified by a number 84 and a bar code 86. The bar code includes information such as the frame number, film speed, film type, and film length. The negative also includes tracking holes 88 for tracking through a camera.

Negatives can be used to make reprints of an image onto photographic paper. In photographic systems, negatives are the original source of the image and thus the best source for high quality reprints. However, the process of making a reprint from a negative is labor intensive and fraught with mistakes. For example, in conventional devices, an operator must align the tracking holes or sides of the negative strip and carefully insert the strip into a feeder. If misaligned, the negative strip will not feed properly and the feeder may jam or otherwise malfunction. The strip must be fed with the emulsion side faced upward, so that a camera can form the image on a print. After feeding the strip, the operator enters order information such as the quantity and size of reprints for a given frame number. This requires a step of monitoring which frame is in position under the camera while simultaneously reading and inputting the order information from an envelope or other source into the reprint machine.

Recent attempts at improving the photographic reprint process have included the use of digital scanning. For example, U.S. Pat. No. 5,841,885 discloses a digital recordation device which scans a negative strip to produce a digital file of the negative and prints a digital record of the file on the reverse side of a print. However, the above patent does not address the aforementioned deficiencies in the photographic reprint process. It would be desirable to have an improved digital photographic reprint process and apparatus which corrects the feeding problems in the prior art.

SUMMARY OF THE INVENTION

We now have found that orders for new prints, CDs, Index Prints, and digital files can be made from negatives using a reorder system and method including the steps of reading a bar code from a negative strip corresponding to individual frames on the negative and scanning the images corresponding to the given frames, in order to reproduce an image which is automatically manipulated by computer software so that the image is in a proper orientation to fulfill the order. Accordingly, an operator need not feed the negative strip in a particular orientation, because the image orientation will automatically be corrected after the scanning step. In a preferred embodiment of the present invention, a multiple strip feeder is disclosed for feeding a stack of negative strips into the reorder system.

The digital reorder system of the present invention includes a digital data scanner for reading bar code information printed on a negative strip and a digital camera for scanning images from the strip to form a digital version of the negative image. The digital image is stored in an image format file and is automatically manipulated by software residing in one or more computers to ensure it is in the proper orientation. By reading the bar code, information such as frame number, film speed, film type, and film length is automatically inputted into a computer. Such information is automatically matched with order information entered by the operator.

Accordingly, an operator can feed the negative strips into a strip feeder without engaging in time consuming efforts of positioning each negative so that the emulsion faces upward. Using the multiple strip feeder according to the present invention, the operator need only place a stack of negatives in a hopper, and the negatives automatically feed one-by-one into the strip feeder. This frees the operator to insert order information, such as the quantity and size of reprints, into the computer. According to the present invention, operator time is dramatically reduced and processing errors can be avoided.

DETAILED DESCRIPTION OF THE INVENTION

Figure 2:
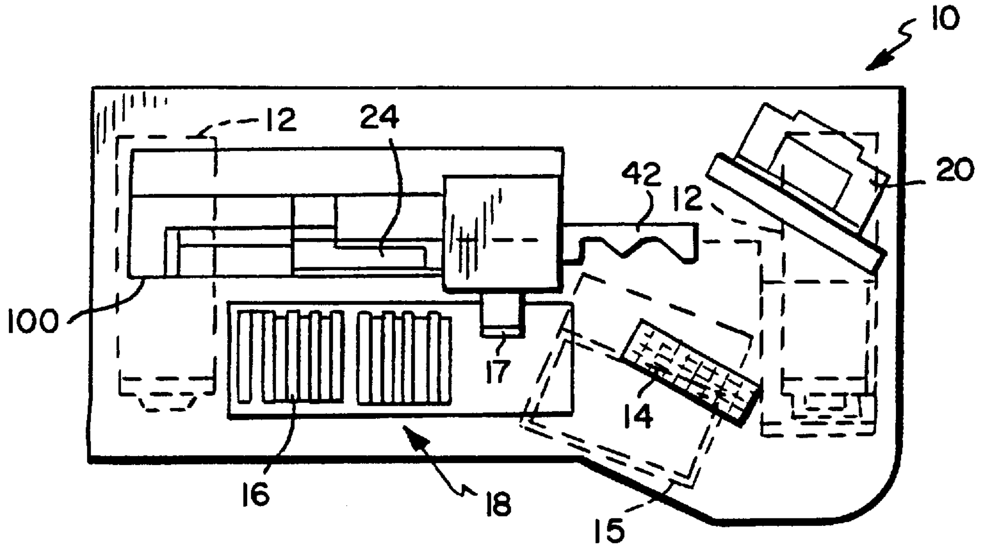
FIG. 2 is a top plan view of the photographic reorder station of FIG. 1.
Figure 1:
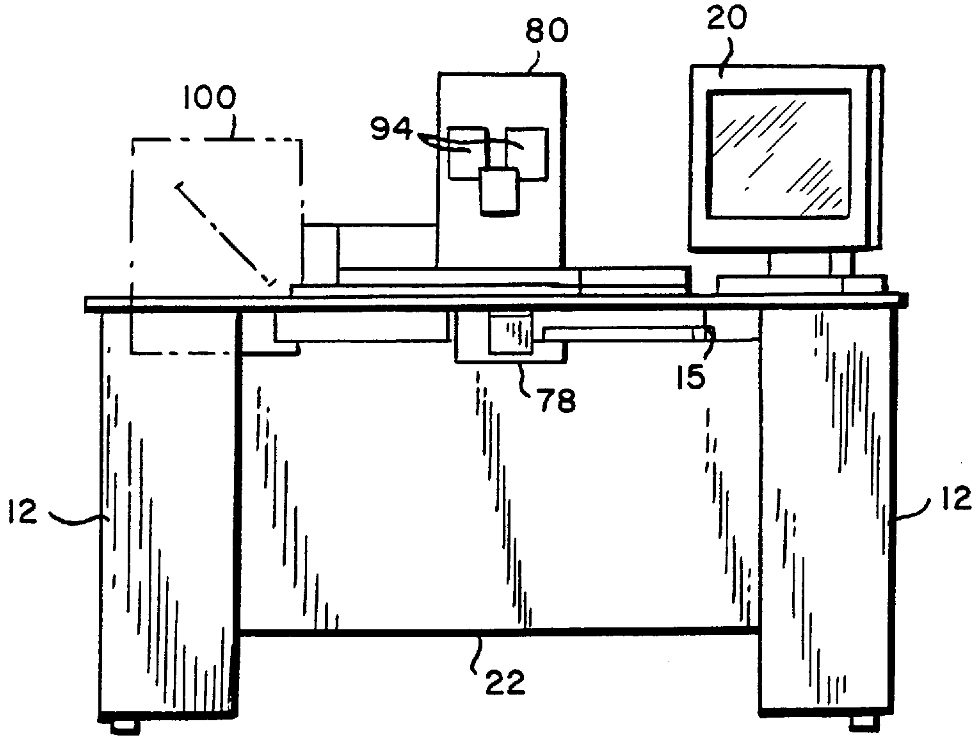
FIG. 1 is a side perspective view of a preferred embodiment of the photographic reorder station.

As shown in FIGS. 1 and 2, a photographic reorder station 10 is disclosed including a digital reprint system and method of the present invention. The station is used to process film reorders, including orders for new prints, CDs, Index Prints, and digital files that are produced from digital data gathered by scanning a customer's film.

Figure 5:
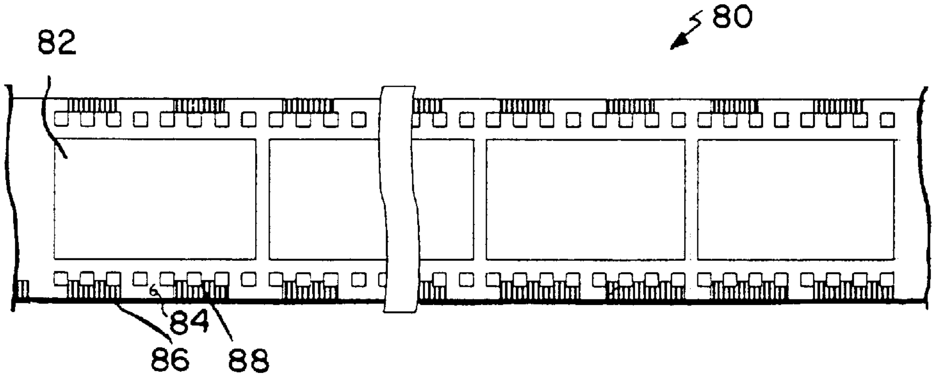
FIG. 5 PRIOR ART
FIG. 5 is a conventional negative film strip.

For a reprint order, an operator at the reorder station 10 typically receives an envelope containing one or more strips of negatives 80 (as shown in FIG. 5) with order information written on the envelope or other source. The order information includes the desired quantity and size of reprints marked for one or more frame numbers 84. The operator inputs the quantity and size information at the reorder station 10.

The photographic reorder station 10 will now be described in detail. As shown in FIGS. 1 and 2, the reorder station includes one or more industrial computers 12 for processing order information entered into a keyboard 14 or other data entry device. In the embodiment shown in FIGS. 1 and 2, the keyboard is mounted on an extractable support 15 which adjusts the keyboard to a preferred operator position. The station can include a light 16 positioned adjacent a work area 18 on a table where the operator places envelopes and order materials. A bar code reader 17 located on or above the table reads dealer and order code information from each envelope. The operator scans the bar code of an envelope and then opens the envelope, removing the negative strips and entering the order information into the computer 12 via the keyboard 14. Once entered, the order information is viewable on a monitor 20, which is preferably an LCD flat panel screen or conventional monitor with a minimum resolution of 800×600. The reorder station can include a storage cabinet 22 for housing electronics components and power supplies.

According to the system and method of the present invention, as described with reference to a negative strip of 135 film, the operator removes one or more negative strips from an envelope to prepare them for feeding. Each strip contains one or more images, each image 82 marked with a frame number 84 and a bar code 86 indicative of the frame number and including one or more of the film speed, film type, and film length. The operator feeds each strip one-by-one in succession into a strip feeder 24.

Figure 3:
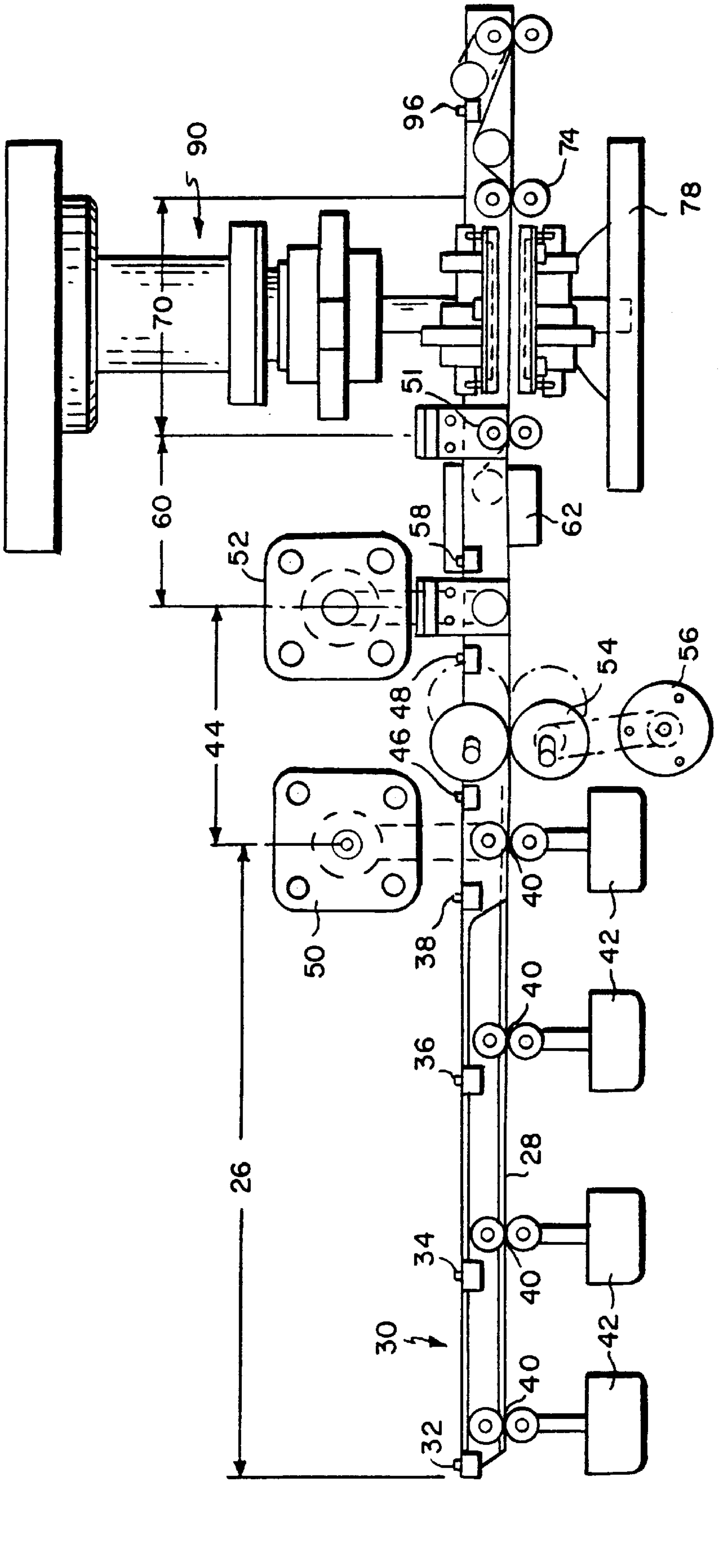
FIG. 3 is a cross-sectional side view of a preferred embodiment of the digital reorder system of the present invention.

FIG. 3 shows various features of the digital reorder system including the path followed by a negative strip through the system. As illustrated in FIG. 3, the digital reorder system includes a strip feeder section 26, a film cleaner section 44, a data scanning section 60, and an image scanning section 70. The strip feeder section 26 corresponds to the strip feeder 24 shown schematically in FIGS. 1 and 2.

The negative strip can be inserted into an opening at an input end 30 of the strip feeder section 26 of the digital reorder system and travels along a film track 28 through the system. The strip is manually inserted by an operator in accordance with loading line marks (not shown) on the film feeder. The strip feeder section includes a plurality of infrared detector sensors 32, 34, 36, and 38 situated parallel to the film track, the sensors detecting the presence of the negative strip in the strip feeder section of the film track 28. Associated with each sensor is a film drive roller pair 40, with individual rollers positioned above and below the film track 28. The roller pairs 40 are actuated by solenoids 42 in response to film strip detection signals from the sensors.

During feeding, the rollers remain disengaged to allow insertion of a negative strip. The strip can be inserted in a direction transverse to the path followed by a negative on the film track 28. Thus, as shown in FIG. 3, the negative can be inserted from the side (into the page) between at least two consecutive roller sets 40. When at least two of the sensors 32, 34, 36, and 38 detect the presence of the strip, signals are transmitted to the solenoids 42 instructing the rollers to close and thereby engage the strip. The negative strip is gripped in the nip of the rollers and conveyed along the film track as driven by a stepper motor 50 which drives the upper roller of its corresponding roller pair 40 and is coupled to the other roller pairs 40 by a conventional belt (not shown). The infrared detector sensors positioned along the film track provide signals to the computer 12 to determine the approximate length of the negative strip for use in the image scanning section 70.

The negative strip is next conveyed to a film cleaner section 44 having infrared detector sensors 46 and 48 positioned adjacent the film track 28 to detect the presence of the negative strip. The film cleaner section includes film brush cleaner rollers 54 driven by a film cleaner motor 56 to rotate and clean the surface of the negative strip passing thereby and a vacuum system (not shown) to expunge any dirt or debris from the strip. Downstream of the film brush rollers 54 is a second stepper motor 52 for driving the upper roller of its corresponding roller pair 51 to further convey the strip along the film track 28. The second stepper motor 52 is coupled to other roller pairs downstream of the second stepper motor 52 to drive the negative strip.

As the trailing edge of the negative strip passes the sensor 46, the stepper motors 50 and 52 are driving their respective rollers at the same speed. When the sensor 46 becomes unblocked, the solenoids 42 are actuated to cause the roller pairs 40 to disengage, so that another negative strip can be inserted into the strip feeder. The solenoids also receive an instruction to disengage roller pairs 40 when the leading edge of the negative strip reaches a sensor 58 in the data scanning section 60 of the reorder system. When disengagement occurs, an indicator light (not shown) illuminates, signaling to the operator that another negative strip can be inserted into the strip feeder.

The data scanning section 60 includes a digital data scanner 62, shown schematically in FIG. 3, which reads the bar code 86 printed beneath each image 82 to obtain the frame number and other information such as the film speed, film type, and film length. Because the data scanner 62 digitally scans the bar code 86, it is able to obtain bar code information from the negative 80 regardless of the orientation of the negative. The data scanner is capable of reading the bar code of a negative inserted properly, i.e. with the emulsion side of the negative faced up, or a negative inserted upside-down, where the emulsion side is faced down. The data scanner is also capable of reading barcodes on negatives inserted first frame first and last frame first.

The data scanner 62 provides bar code information to the computer, including the orientation of the bar code and thus the image orientation. It also electronically determines the frame location between images that is used for positioning the film for scanning in the image scanning section 70. The stepper motor 52 drives the roller pairs 51, 72, and 74 based on the requirements of the image scanning section, as discussed below.

The roller pair 72 conveys the negative into the image scanning section 70. The negative is conveyed so that a first frame thereof is positioned beneath a digital camera 90 (see also FIG. 1). Data provided by infrared detector sensors 58 and 96 assist in positioning the negative strip. A film flattener and mask device 76 is lowered over the negative to flatten and fix the negative in place, and the digital camera 90 scans the image and inputs the scanned image into the computer 12. An LED light 78 positioned below the film track 28 provides proper illumination during the scanning procedure. The digital camera 90 can include camera cooling intake fans 94 to provide ventilation to the camera.

The digital camera 90 produces an image file for each image from the negative and displays the scanned image on the monitor 20. The operator can view the monitor to verify the accuracy of the image. The computer 12 is capable of storing an image file for each image in a permanent file for later access.

The image scanning section contains density sensors (not shown) which detect the presence of image frames on the negative strip. The rollers 72 and 74 are driven to automatically position the negative so that the digital camera 90 accurately scans each image. Based on the bar code 86 read by the data scanner 62 and the scanned image obtained from the digital camera 90, the computer 12 determines whether the image is in a proper orientation, i.e. whether it is right-side-up or upside-down. If the image is upside down or crooked, the computer 12 in accordance with preloaded software automatically manipulates and corrects the image positioning and orientation.

Thus, an operator need not waste valuable time at the strip insertion stage in determining which direction the emulsion faces on a negative strip or whether the negative strip is oriented first frame first or last frame first. The operator simply inserts the negative strips one-by-one into the strip feeder, as instructed by the indicator light. After insertion of a negative, the operator enters order information including size and quantity of reprints into the computer 12 via the keyboard 14. The computer 12 matches the order information with the bar code information and the scanned image and forms the reprints accordingly. The negative strip is output from the image scanning section into a strip collector 92.

Figure 4B:
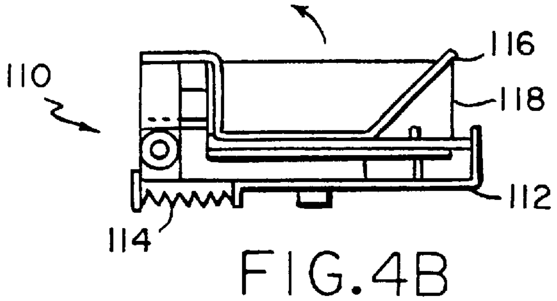
FIG. 4B is an end view along the line 4B—4B of FIG. 4A, wherein the view is rotated 90 degrees.

In a preferred embodiment of the present invention, a multiple strip feeder 100 is attached to the strip feeder 24 (see FIG. 2) at the input end 30 depicted in FIG. 3. The multiple strip feeder 100 is shown in detail in FIGS. 4A and 4B. The operator inputs a negative strip width into the computer 12 and inserts flat negative strips into a hopper 110. The computer 12 adjusts the width of a bottom plate 112 which is attached by a spring 114 to the hopper 110, as shown in FIG. 4B. The bottom plate operates as an outboard strip pusher, adjusting automatically with the bias of the spring 114 to square the negatives inserted therein. A hinged top guide and roller assembly 116 rests above the bottom plate 112 such that negatives are inserted into an opening 118 between the top guide and the bottom plate.

Figure 4A:
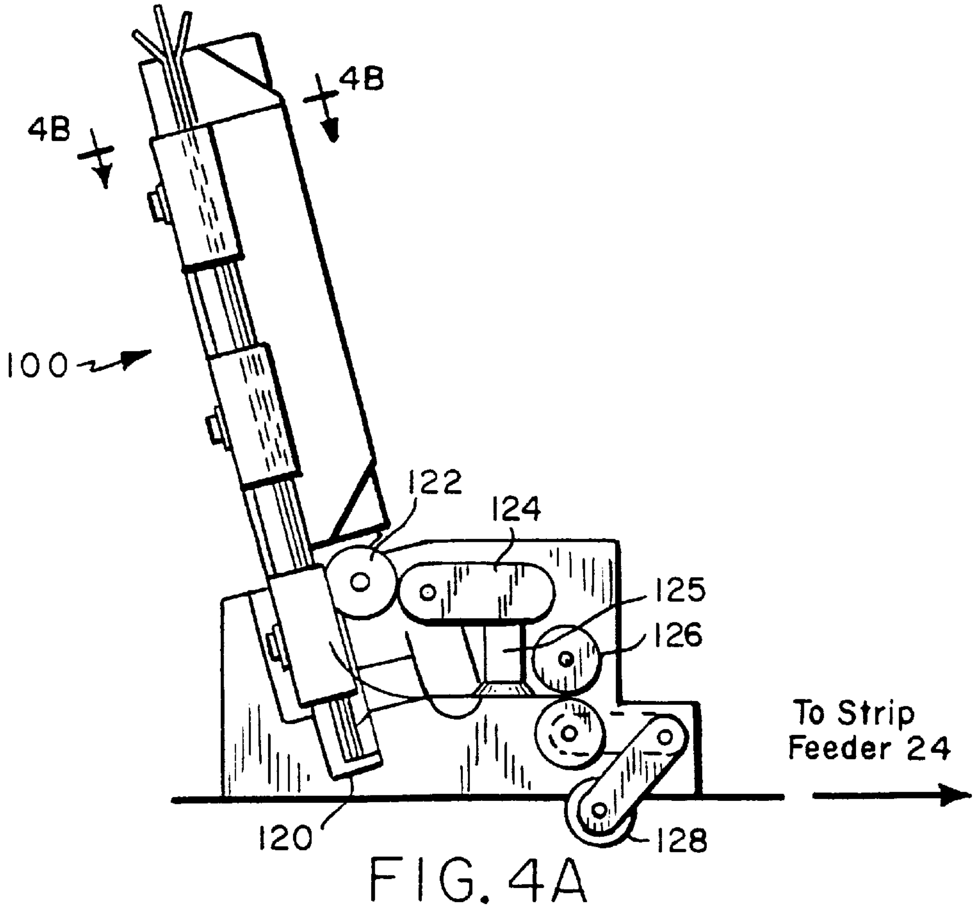
FIG. 4A is a side view of a preferred embodiment of the multiple strip feeder of the present invention.

As shown in FIG. 4A, the ends of the negative strips abut a stopper 120. The strips are guided into a rest position against the stopper by a foam or rubber roller 122. An infrared detector sensor (not shown) detects whether a negative strip is present in the hopper 110. If at least one negative strip is present, a solenoid or air actuated pivot arm 124 having at least one vacuum cup 125 mounted on the end thereof rotates toward the negative strip, engages the strip, and by virtue of suction transports the strip toward exit roller pair 126 and 128. Exit roller 126 is a drive roller positioned above the path of the negative strip. Roller 128 is a solenoid or air actuated roller which rotates to form a nip with drive roller 126 to convey the negative strip toward the input end of the feeder 24.

The multiple strip feeder of the present invention allows the operator to insert negative strips into the reorder system regardless of their orientation. The operator need only gather the strips from an envelope and drop them into the hopper. Accordingly, processing time is reduced, as the operator need not feed the strips individually into a machine or inspect the negatives to ensure that the emulsion side is faced upward. The operator is free to enter order information into the keyboard while the feed process occurs.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. A photographic reorder system for making a print from a negative strip, the negative strip having at least one frame and a bar code corresponding to the frame, comprising:

a multiple strip feeder for holding a stack of negative strips;

a strip feeder section for receiving the negative strips from the multiple strip feeder and conveying each negative strip along a film track;

a data scanning section along the film track downstream of the strip feeder section, the data scanning section having a data scanner for reading the bar code and transmitting bar code information to a computer; and an image scanning section including a camera for scanning a frame image, the scanned image being transmitted to the computer, wherein the computer automatically adjusts an orientation of the scanned image for forming the print.

2. The photographic reorder system of claim 1, wherein the camera is a digital camera.

3. The photographic reorder system of claim 1, wherein the multiple strip feeder includes a hopper for receiving the stack of negative strips and a bottom plate adjustable to a width of the stack.

4. The photographic reorder system of claim 3, wherein the multiple strip feeder includes a pivoting vacuum arm for separating one of the negative strips from the stack.

5. The photographic reorder system of claim 1, and further including a film cleaner section positioned along the film track upstream of the data scanning section for cleaning the negative strip prior to scanning.

6. The digital photographic reorder system of claim 1, wherein the system can process negatives from 135 film and Advanced Photo System film.

7. The digital photographic reorder system of claim 1, wherein the system can form prints, CDs, Index Prints, and digital files.

8. A method of making a print from a negative strip, comprising the steps of:

receiving a stack of negative strips in a multiple strip feeder;

feeding a first negative strip along a film track;

scanning a bar code on the first negative strip corresponding to a frame and transmitting the scanned bar code information to a computer;

scanning an image on the frame and transmitting the scanned image to the computer; and using the scanned image and bar code information to adjust an orientation of the image automatically on the computer.

9. The method of claim 8, and further including the step of separating the first negative strip from the stack using a vacuum pivot arm in order to feed the first negative strip.

10. A digital photographic reorder system for making a print from a negative strip, the negative strip having at least one frame and a bar code corresponding to the frame, comprising:

a multiple strip feeder for holding a stack of negative strips and automatically feeding the negative strips;

a strip feeder section for receiving the negative strips from the multiple strip feeder and conveying each negative strip along a film track;

a data scanning section along the film track downstream of the strip feeder section, the data scanning section having a data scanner for reading the bar code and transmitting bar code information to a computer; and an image scanning section including a digital camera for scanning a frame image, the scanned image being transmitted to the computer, wherein the computer automatically adjust an orientation of the scanned image for forming the print.

11. The digital photographic recorder system of claim 10, wherein the multiple strip feeder includes a hopper for receiving the negative strips.

12. The digital photographic reorder system of claim 11, wherein the multiple strip feeder includes a pivoting vacuum arm for separating one of the negative strips from the other negative strips.

13. The digital photographic reorder system of claim 10, and further including a film cleaner section positioned along the film track upstream of the data scanning section for cleaning the negative strip prior to scanning.

14. The digital photographic reorder system of claim 10, wherein the system can process negatives from 135 film and Advanced Photo System film.

15. The digital photographic reorder system of claim 10, wherein the system can form prints, CDs, Index Prints, and digital files.

16. A photographic reorder system for making a print from a negative strip, the negative strip having at least one frame, comprising:

a multiple strip feeder for receiving a stack of negative strips and automatically feeding each negative strip to a film track; and a camera positioned along the film track for scanning a frame image to produce a print from the frame image.

17. The photographic reorder system of claim 16, wherein the multiple strip feeder includes a hopper for receiving the negative strips.

18. The photographic reorder system of claim 17, wherein the multiple strip feeder includes a pivoting vacuum arm for separating one of the negative strips from the other negative strips.

19. The photographic reorder system of claim 16, wherein the camera is a digital camera.

20. A photographic reorder system for making a print from a negative strip, the negative strip having at least one frame, comprising:

a multiple strip feeder for receiving negative strips and automatically feeding each negative strip to a film track, wherein the multiple strip feeder includes a pivoting vacuum arm for separating one of the negative strips from the other negative strips; and a camera positioned along the film track for scanning a frame image to produce a print from the frame image.

21. The photographic reorder system of claim 20, wherein the multiple strip feeder includes a hopper for receiving the negative strips.

22. The photographic reorder system of claim 21, wherein the hopper includes a bottom plate adjustable to the width of the stack.

* * * * *